US009747187B2

(12) United States Patent
Fink et al.

(10) Patent No.: US 9,747,187 B2
(45) Date of Patent: *Aug. 29, 2017

(54) SIMULATING BLACK BOX TEST RESULTS USING INFORMATION FROM WHITE BOX TESTING

(75) Inventors: Stephen Fink, Yorktown Heights, NY (US); Yinnon A. Haviv, Beerotaim (IL); Roee Hay, Haifa (IL); Marco Pistoia, Amawalk, NY (US); Ory Segal, Tel Aviv (IL); Adi Sharabani, Ramat Gan (IL); Manu Sridharan, Boulder, CO (US); Frank Tip, Ridgewood, NJ (US); Omer Tripp, Har-Adar (IL); Omri Weisman, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 571 days.

This patent is subject to a terminal disclaimer.

(21) Appl. No.: 12/913,314

(22) Filed: Oct. 27, 2010

(65) Prior Publication Data
US 2012/0110551 A1   May 3, 2012

(51) Int. Cl.
*G06F 11/36*   (2006.01)
*G06F 9/445*   (2006.01)
(Continued)

(52) U.S. Cl.
CPC ...... *G06F 11/3604* (2013.01); *G06F 9/44589* (2013.01); *G06F 9/455* (2013.01);
(Continued)

(58) Field of Classification Search
CPC .............. G06F 11/3684; G06F 21/577; G06F 2221/033; G06F 11/3604; G06F 11/36; G06F 11/362; G06F 9/44589; G06F 9/455

See application file for complete search history.

(56) References Cited

U.S. PATENT DOCUMENTS 6,006,328 A    12/1999 Drake
6,249,882 B1    6/2001 Testardi
(Continued)

FOREIGN PATENT DOCUMENTS

WO    2012166120 A1    12/2012

OTHER PUBLICATIONS

Yoon H, Choi B; Inter-class test technique between black-box-class and white-box-class for component customization failures; Dec. 1999; Proceedings of the 1999 Asia Pacific Software Engineering Conference (APSEC '99); pp. 162-165.*

(Continued)

*Primary Examiner* — Lewis A Bullock, Jr.
*Assistant Examiner* — Jacob Dascomb
(74) *Attorney, Agent, or Firm* — Patterson + Sheridan, LLP

(57) ABSTRACT

Systems, methods are program products for simulating black box test results using information obtained from white box testing, including analyzing computer software (e.g., an application) to identify a potential vulnerability within the computer software application and a plurality of milestones associated with the potential vulnerability, where each of the milestones indicates a location within the computer software application, tracing a path from a first one of the milestones to an entry point into the computer software application, identifying an input to the entry point that would result in a control flow from the entry point and through each of the (Continued)

milestones, describing the potential vulnerability in a description indicating the entry point and the input, and presenting the description via a computer-controlled output medium.

8 Claims, 4 Drawing Sheets

(51) Int. Cl.
    *G06F 9/455*     (2006.01)
    *G06F 21/57*     (2013.01)
(52) U.S. Cl.
    CPC ............ *G06F 11/36* (2013.01); *G06F 11/362* (2013.01); *G06F 21/577* (2013.01); *G06F 2221/033* (2013.01)

(56) References Cited

U.S. PATENT DOCUMENTS

| | | | |
|---|---|---|---|
| 6,959,431 | B1 | 10/2005 | Shiels et al. |
| 6,978,228 | B1* | 12/2005 | Gordon ............................ 703/1 |
| 7,028,223 | B1 | 4/2006 | Kolawa et al. |
| 7,596,778 | B2 | 9/2009 | Kolawa et al. |
| 7,603,660 | B2 | 10/2009 | Davia et al. |
| 7,665,072 | B2* | 2/2010 | Tillman et al. ............... 717/132 |
| 7,685,575 | B1* | 3/2010 | Fareed ........................... 717/131 |
| 7,900,193 | B1 | 3/2011 | Kolawa et al. |
| 7,987,390 | B2* | 7/2011 | Chandrasekaran .......... 714/38.1 |
| 8,024,807 | B2 | 9/2011 | Hall et al. |
| 8,122,438 | B2* | 2/2012 | Cain et al. .................... 717/130 |
| 8,122,439 | B2* | 2/2012 | Cascaval et al. ............. 717/140 |
| 8,136,095 | B2 | 3/2012 | Natanov et al. |
| 8,141,158 | B2 | 3/2012 | Calendino et al. |
| 8,276,123 | B1 | 9/2012 | Deng et al. |
| 8,296,735 | B2* | 10/2012 | Fehnker et al. .............. 717/124 |
| 8,370,798 | B2* | 2/2013 | Broadfoot et al. ........... 717/107 |
| 8,397,300 | B2 | 3/2013 | Tripp |
| 8,484,732 | B1 | 7/2013 | Chen et al. |
| 8,528,095 | B2 | 9/2013 | Haviv et al. |
| 8,539,585 | B2 | 9/2013 | Chen et al. |
| 2003/0046029 | A1 | 3/2003 | Wiener et al. |
| 2003/0140337 | A1* | 7/2003 | Aubury ......................... 717/158 |
| 2004/0230956 | A1* | 11/2004 | Cirne et al. ................... 717/128 |
| 2005/0273861 | A1* | 12/2005 | Chess ..................... G06F 21/54 726/25 |
| 2005/0283768 | A1* | 12/2005 | Ozone ........................... 717/144 |
| 2006/0010497 | A1* | 1/2006 | O'Brien ................. G06Q 10/10 726/26 |
| 2007/0061625 | A1 | 3/2007 | Acosta, Jr. et al. |
| 2007/0226794 | A1* | 9/2007 | Howcroft ................ G06F 21/57 726/22 |
| 2008/0184208 | A1* | 7/2008 | Sreedhar et al. ............. 717/128 |
| 2008/0244321 | A1 | 10/2008 | Kelso |
| 2009/0119777 | A1* | 5/2009 | Jeon ..................... H04L 63/1433 726/25 |
| 2009/0132861 | A1* | 5/2009 | Costa .................. G06F 11/0748 714/45 |
| 2009/0282480 | A1 | 11/2009 | Lee et al. |
| 2010/0088683 | A1* | 4/2010 | Golender et al. ............. 717/128 |
| 2010/0229158 | A1* | 9/2010 | Ike ................................ 717/128 |
| 2011/0055813 | A1* | 3/2011 | Calendino ........... G06F 11/3672 717/124 |
| 2011/0191855 | A1 | 8/2011 | De Keukelaere et al. |
| 2011/0231936 | A1 | 9/2011 | Williams et al. |
| 2012/0011493 | A1 | 1/2012 | Singh et al. |
| 2012/0110549 | A1 | 5/2012 | Gutz et al. |
| 2012/0110551 | A1 | 5/2012 | Fink et al. |
| 2012/0254839 | A1 | 10/2012 | Fink et al. |
| 2012/0266248 | A1 | 10/2012 | Amit et al. |
| 2013/0024846 | A1 | 1/2013 | Lewis et al. |
| 2015/0095886 | A1 | 4/2015 | Tripp |
| 2015/0095888 | A1 | 4/2015 | Tripp |

OTHER PUBLICATIONS

T. Y. Chen et al., "White on Black: A White-Box-Oriented Approach for Selecting Black-Box-Generated Test Cases", Proceedings of the First Asia-Pacific Conference on Quality Software, Oct. 30-31, 2000, Hong Kong, China, pp. 275-284.

E. Steegmans et al., "Black & White Testing: Bridging Black Box Testing and White Box Testing", Conferentie Software Testing: Beheers Optimaal de Risico's van IT in uw Business, location:Leuven, Belgium, date: Jan. 20-21, 2004, pp. 1-12, <<https://lirias.kuleuven.be/bitstream/123456789/134277/1/Paper.pdf>>.

Stephen H. Edwards, "Black-Box Testing Using Flow Graphs: An Experimental Assessment of Effectiveness and Automation Potential", Software Testing, Verification and Reliability, vol. 10, No. 4, pp. 249-262, Dec. 2000, <<http://people.cs.vt.edu/~edwards/downloads/edwards-stvr-0012.pdf>>.

Nicolas Kicillof et al., "Achieving Both Model and Code Coverage W Ith Automated Gray-Box Testing", Proceedings of the 3rd International Workshop on Advances in Model-Based Testing, London, United Kingdom, Jul. 9-12, 2007, pp. 1-11, Publisher: Association for Computing Machinery, New York, NY, USA.

Jörg Herrmann et al., "Variants of Validity and Their Impact on the Overall Test Space", Proceedings of the Eleventh International Florida Artificial Intelligence Research Society Conference, pp. 472-477, Year of Publication: 1998, Publisher: AAAI Press, <<http://www.aaai.org/Papers/FLAIRS/1998/FLAIRS98-091.pdf>>.

Michal Chmielewski et al., "Find and Fix Vulnerabilities Before Your Application Ships", MSDN Magazine, Nov. 2007 Issue, Publisher: Microsoft Corporation, <<http://msdn.microsoft.com/en-us/magazine/cc163312.aspx>>.

James Skene, "CS 230 Software Design and Construction—Part 3: Introduction to software engineering—Topic 6: Verification", Department of Computer Science, University of Auckland, New Zealand, May 2009, <<http://www.cs.auckland.ac.nz/compsci230s1c/lectures/james/cs230-2009-6.pdf>>.

Galan, E., et al., A Multi-agent Scanner to Detect Stored-XSS Vulnerabilities, 2010 International Confere3nce for Internet Technology and Secured Transactions, Nov. 2010, pp. 1-6, IEEE, Piscataway, United States.

Gebre, Misganaw, et al., A Robust Defense Against Content-Sniffing XSS Attacks, 6th International Conference on Digital Content, Aug. 2010, pp. 315-320, IEEE, Piscataway, United States.

U.S. Appl. No. 13/493,067 entitled "Simulating Black Box Test Results Using Information From White Box Testing,", filed Jun. 11, 2012.

Fink et al., "Snugglebug: A Powerful Approach to Weakest Preconditions," ACM, Jun. 15-20, 2009, pp. 363-374.

Dewhurst Ryan, Implementing basic static code analysis into integrated development environments (ides) to reduce software vulnerablitilies, A Report submitted in partial fulfillment of the regulations governing the award of the Degree of BSc (Honours) Ethical Hacking for Computer Security at the University of Northumbria at Newcastle, 2011-2012.

\* cited by examiner

```
[1]   class UsernameServlet {
[2]      public void doGet(HttpServletRequest req,
[3]                       HttpServletResponse res) {
[4]         handle(req, res);
[5]      }
[6]      private void handle(HttpServletRequest req,
[7]                          HttpServletResponse res) {
[8]         String username = req.getParameter("username");
[9]         PrintWriter w = res.getWriter();
[10]        w.println("username is " + username);
[11]     }
[12]  }
```

Fig. 3

SIMULATING BLACK BOX TEST RESULTS USING INFORMATION FROM WHITE BOX TESTING

BACKGROUND

Software testing methods fall into two general categories: white box testing and black box testing. White box testing methods entail exposing and statically analyzing the internal workings of a software application, without executing the application. Black box testing methods, on the other hand, entail testing an application during its execution and without relying on any knowledge of the internal structure of the application. Although white box testing provides the advantage of revealing the precise nature and location of a potential vulnerability of an application, as the application has not been executed, any such exposed vulnerability is theoretical, providing no proof of vulnerability to the developer. Additionally, white box testing expresses potential vulnerabilities in terms of locations within an application's programming instructions that are intelligible only to application developers. Conversely, having executed an application, black box testing both provides the developer with proof of vulnerability, and exposes susceptibilities to attacks from a user's point of view. However, black box testing is often computationally expensive as the tester is 'blind' to the internal structure of the application, requiring many execution attempts before a vulnerability is discovered.

SUMMARY

In one aspect of the present invention a system is provided for simulating black box test results using information obtained from white box testing, the system including a white box tester configured to analyze computer software (e.g., an application) to identify a potential vulnerability within the computer software application and a plurality of milestones associated with the potential vulnerability, where each of the milestones indicates a location within the computer software application, an entry point tracer configured to trace a path from a first one of the milestones to an entry point into the computer software application, an input analyzer configured to identify an input to the entry point that would result in a control flow from the entry point and through each of the milestones, and a black box simulator configured to describe the potential vulnerability in a description indicating the entry point and the input and present the description via a computer-controlled output medium.

In another aspect of the invention a method is provided for simulating black box test results using information obtained from white box testing, the method including analyzing computer software (e.g., an application) to identify a potential vulnerability within the computer software application and a plurality of milestones associated with the potential vulnerability, where each of the milestones indicates a location within the computer software application, tracing a path from a first one of the milestones to an entry point into the computer software application, identifying an input to the entry point that would result in a control flow from the entry point and through each of the milestones, describing the potential vulnerability in a description indicating the entry point and the input, and presenting the description via a computer-controlled output medium.

A computer program product embodying the invention is also provided.

BRIEF DESCRIPTION OF THE DRAWINGS

The invention will be understood and appreciated more fully from the following detailed description taken in conjunction with the appended drawings in which:

FIG. 3, which is an exemplary code sample useful in understanding the system and method of FIGS. 1 and 2.

DETAILED DESCRIPTION

Figure 1:
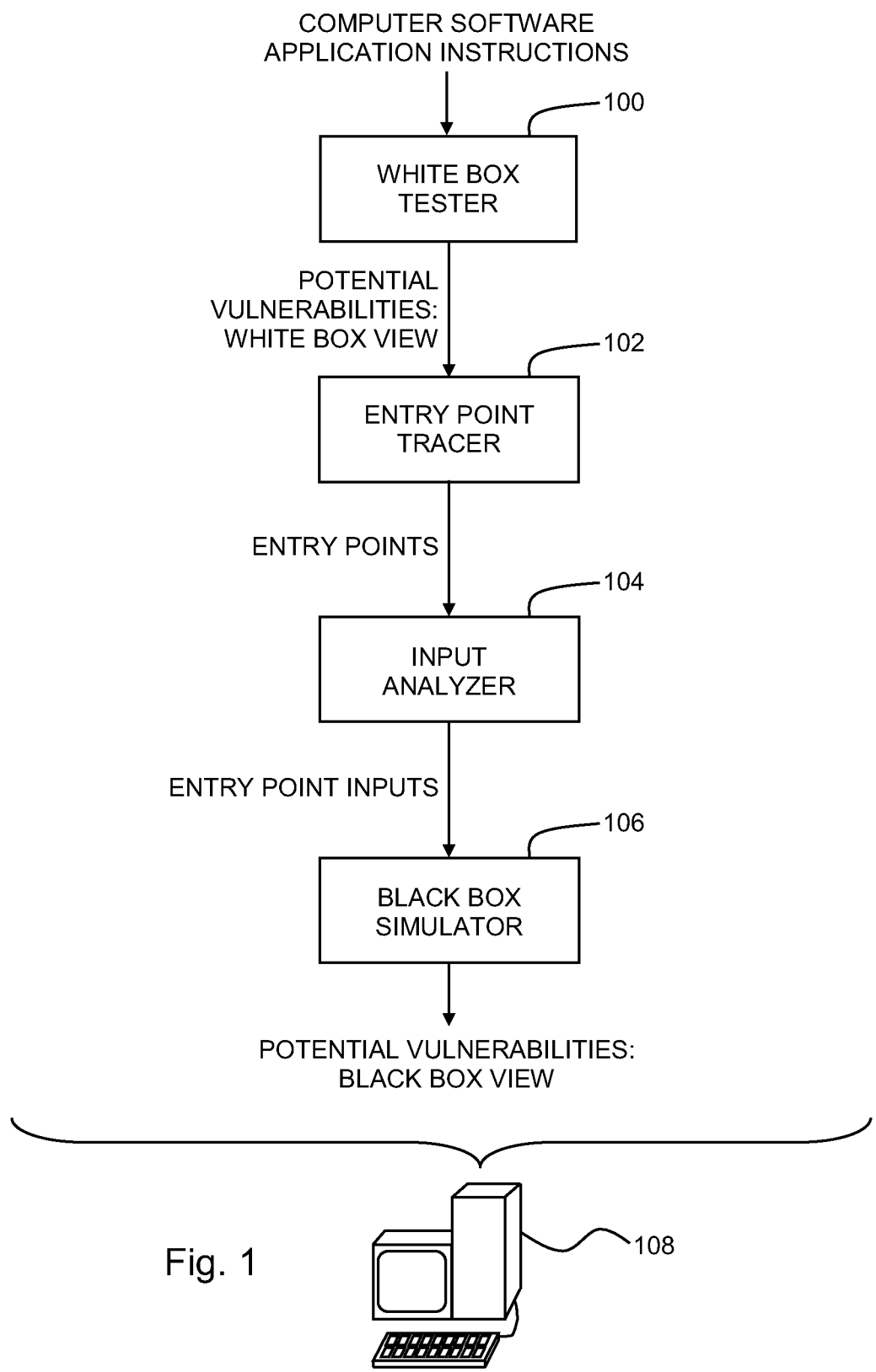
FIG. 1 is a simplified conceptual illustration of a system for simulating black box test results using information obtained from white box testing, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for simulating black box test results using information obtained from white box testing, constructed and operative in accordance with an embodiment of the invention. In the system of FIG. 1, a white box tester 100 is configured to use conventional methods, such as static analysis, to analyze the instructions and related resource files of computer software (e.g., an application), such as where the instructions are in the form of source code or bytecode, to identify potential vulnerabilities within the application. White box tester 100 preferably describes each identified potential vulnerability by indicating the type of vulnerability identified, the location or locations within the application instructions and related resource files where the vulnerability was identified, each location now referred to herein as a "milestone," and one or more variables related to the vulnerability. Below is an example of an identified potential vulnerability and its white-box description:

SQL injection vulnerability at line 38 of file DatabaseUtil.java. Variable x in statement sqlStatement.executeQuery(x); might contain malicious data.

An entry point tracer 102 is configured to trace one or more paths, using conventional techniques, from the first milestone of a given potential vulnerability identified during white box testing to one or more entry points into the application, where an entry point is defined as a location within an application where an interface is exposed to receive input to the application from a source that is external to the application. Entry point tracer 102 may, for example, construct a call graph of method invocations within the application, using conventional techniques, and utilize the call graph to trace the paths.

An input analyzer 104 is configured to identify, using conventional techniques, the inputs to an entry point identified by entry point tracer 102 for the given potential vulnerability. Input analyzer 104 may, for example, employ constant-propagation and string-analysis techniques to extract the values of non-constant variables that participate in computations at the entry point. Input analyzer 104 then determines which of the identified inputs would result in a control flow from the entry point and through each of the milestones of the given potential vulnerability, such as by employing control-flow and data-flow analysis techniques, as well as constant-propagation and string-analysis techniques, where each milestone is analyzed to identify any constraints it places on an input in order to allow the control flow to reach the milestone given the input.

A black box simulator 106 is configured to take a given potential vulnerability, identified during white box testing and described in terms of the location or locations within the application instructions and related resource files where the vulnerability was identified, and describe the potential vulnerability in terms of its associated entry points as identified by entry point tracer 102 and associated inputs as identified by input analyzer 104, thereby creating a black box view of the potential vulnerability identified during white box testing. Thus, for example, the following white box description of an identified potential vulnerability:

SQL injection vulnerability at line 38 of file DatabaseUtil.java. Variable x in statement sqlStatement.executeQuery(x); might contain malicious data.

becomes:

SQL injection vulnerability at URL http://www.my.site/members/search.jsp. Parameter searchTerm flows into an SQL query without validation.

Black box simulator 106 preferably presents the black box view of the potential vulnerability via a computer-controlled output medium, such as a computer display or printout.

Any of the elements shown in FIG. 1 are preferably executed by or otherwise made accessible to a computer 108, such as by implementing any of the elements in computer hardware and/or in computer software embodied in a physically-tangible, computer-readable medium in accordance with conventional techniques.

Figure 2:
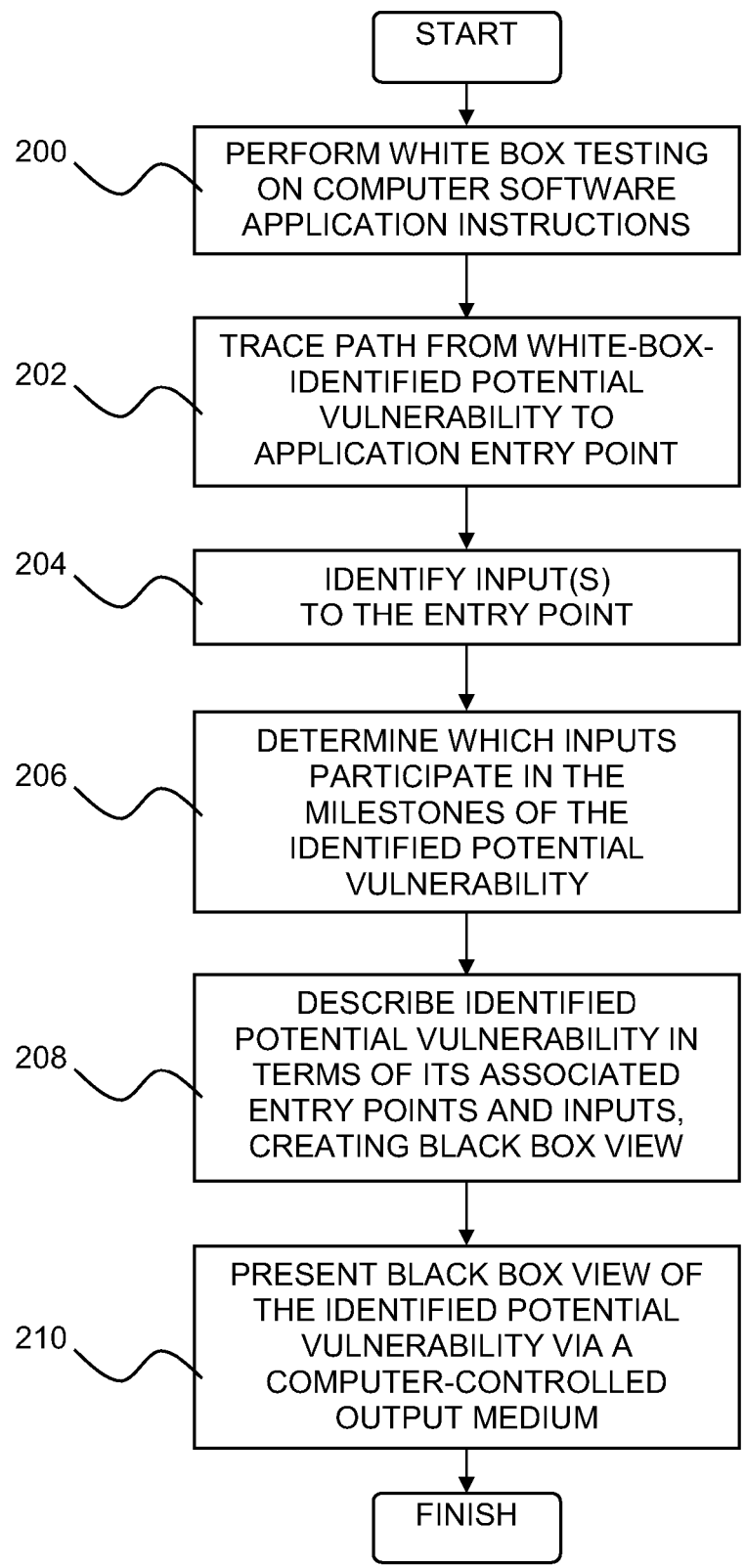
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, white box testing is performed on the instructions and related resource files of a computer software application to identify potential vulnerabilities within the application (step 200). For any, and preferably every, identified potential vulnerability, a path is traced from the first milestone of the identified potential vulnerability being processed to one or more entry points into the application (step 202). For any, and preferably every, identified entry point, the inputs to the entry point are identified (step 204). It is then determined which of the identified inputs would result in a control flow from the entry point and through each of the milestones of the given potential vulnerability being processed (step 206). The identified potential vulnerability being processed is then described in terms of its associated entry points and associated inputs (step 208), thereby creating a black box view of the potential vulnerability identified during white box testing. The black box view of the potential vulnerability is provided via a computer-controlled output medium, such as a computer display or printout (step 210).

Additional reference is now made to FIG. 3, which is an exemplary code sample useful in understanding the system and method of FIGS. 1 and 2. In the example of FIG. 3, the Java™ code shown is stored in a file named "UsernameServlet.java," for which white box testing produces the following report:

XSS vulnerability at line 12 of file UsernameServlet.java.
Variable username in statement w.println("username is"+username); might contain malicious data.

The first milestone for this report is the statement at line 8, which reads potentially malicious data via the method call req.getParameter("username"). From this milestone, entry point tracer 102 identifies the UsernameServlet.doGet( ) method as a corresponding entry point. Then, input analyzer 104 discovers that the HTTP request parameter "username" contains the potentially malicious data by performing a string constant analysis of the parameter to the req.getParameter( ) call on line 8. Finally, black box simulator 106 consults the web.xml file for the application to discover a URL corresponding to the UsernameServlet class, such as http://www.my.site/username.html. Black box simulator 106 then presents the black box view of the potential vulnerability as XSS vulnerability at URL http://www.my.site/username.html. Parameter username is added to the HTTP response without validation.

Figure 4:
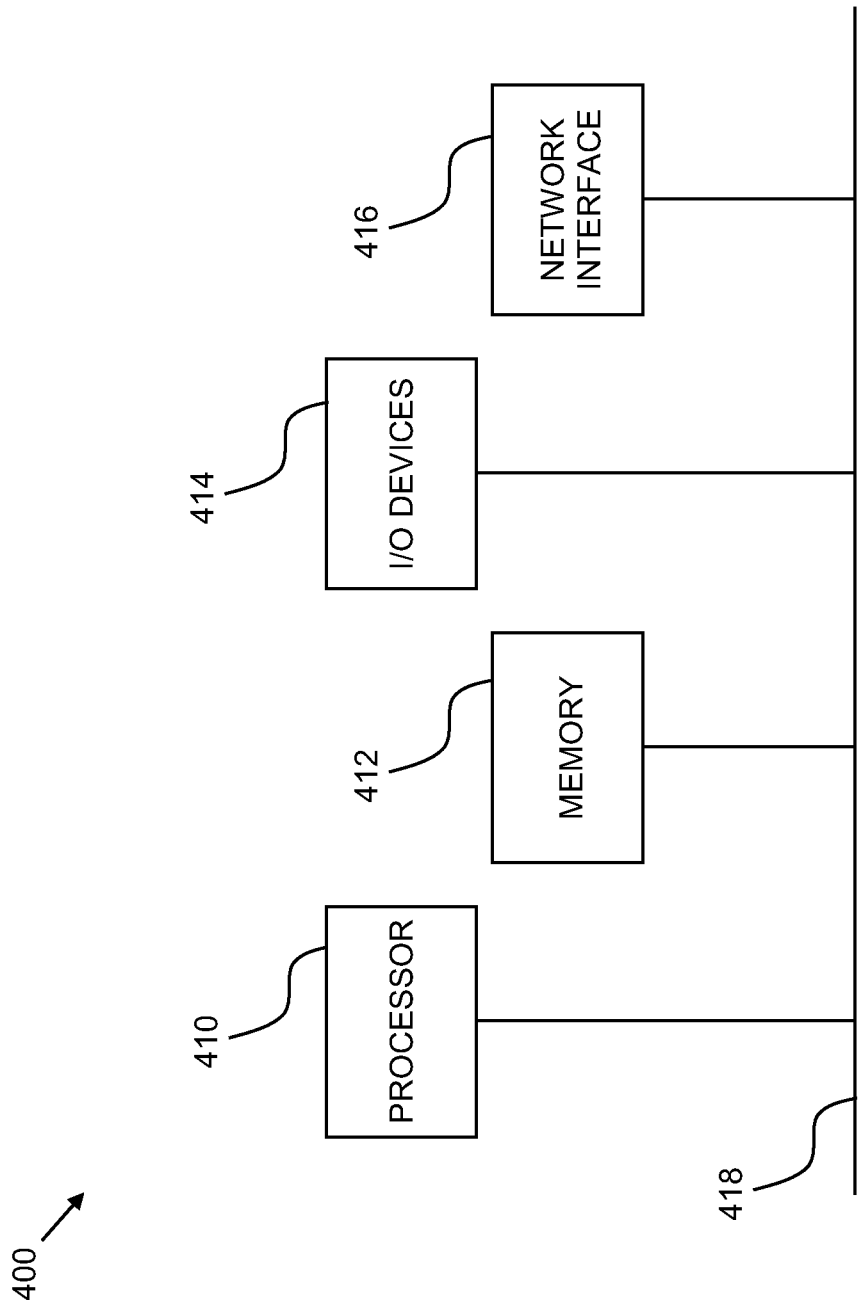
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, I/O devices 414 and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality and operation of possible implementations of systems, methods and computer program products according to various embodiments of the invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system, comprising:
   a white box tester that statically analyzes computer software to identify a plurality of milestones, including a first milestone, associated with a potential vulnerability within the computer software, wherein each of the milestones indicates a location of a method call of a source code statement within the computer software at which a data item can be accessed and modified and wherein the first milestone indicates a first source code location within the computer software at which the data item can be accessed and modified without validation, resulting in the potential vulnerability;

an entry point tracer that identifies one or more entry points into the computer software associated with the potential vulnerability by tracing paths from the source code statement of the first milestone, wherein each entry point provides a method location where an interface of the computer software is exposed to receive input external to the computer software;

an input analyzer that identifies one or more HTTP request parameter inputs to at least a first one of the one or more entry points that results in a control flow from the first entry point to the first milestone; and a black box simulator that:
 automatically identifies, from a consultation of an Extensible Markup Language (XML) configuration file for a web server executing the computer software, a uniform resource locator (URL) of a class representing the computer software having the potential vulnerability based on the first entry point and the one or more identified HTTP request parameter inputs; and
 presents a simulated black box test result for the computer software by generating a description of the potential vulnerability indicating the identified URL exposing the potential vulnerability, and one or more of the identified HTTP request parameter inputs that have not been validated.

2. The system of claim 1 wherein the entry point tracer is configured to construct a call graph of method invocations within the computer software and utilize the call graph to trace the path.

3. The system of claim 1 wherein the input analyzer is configured to analyze each of the milestones to identify any constraints the milestone places on the input in order to allow the control flow to reach first the milestone given the input.

4. The system of claim 1 wherein the computer software is an application.

5. A computer program product, comprising:
a non-transitory computer-readable storage medium; and
computer-readable program code embodied in the computer-readable storage medium, wherein the computer-readable program code:
 statically analyzes computer software to identify a plurality of milestones, including a first milestone, associated with a potential vulnerability within the computer software, wherein each of the milestones indicates a respective location of a method call within a respective source code statement of the computer software which accesses a data variable associated with the potential vulnerability and the first milestone indicates a first source code location of the method call within the computer software which allows the data variable to be accessed and modified without validation, resulting in the potential vulnerability,
 identifies one or more entry points into the computer software associated with the potential vulnerability by tracing paths from the source code statement associated with the first milestone, wherein each entry point is a location where an interface of the computer software is exposed to receive input to the computer software from a source that is external to the computer software,
 identifies one or more HTTP request parameter inputs to at least a first one of the one or more entry points that results in a control flow from the first entry point to the first milestone,
 automatically identifies, from a consultation of an Extensible Markup Language (XML) configuration file for a web server executing the computer software, a uniform resource locator (URL) of a class representing the computer software having the potential vulnerability based on the first entry point and the one or more HTTP request parameter inputs, and
 presents a simulated black box test result detailing, for the computer software, a description of the potential vulnerability, the identified URL exposing the potential vulnerability, and one or more of the identified HTTP request parameter inputs that have not been validated.

6. The computer program product of claim 5, wherein the computer-readable program code is configured to construct a call graph of method invocations within the computer software and utilizing the call graph to trace the path.

7. The computer program product of claim 5, wherein the computer-readable program code is configured to analyze each of the milestones to identify any constraints the milestone places on the input in order to allow the control flow to reach the first milestone given the input.

8. The computer program product of claim 5 wherein the computer software is an application.

\* \* \* \* \*